May 5, 1936.                C. L. CAMPBELL                2,039,702
                                WEEDER
                         Filed Dec. 27, 1935            2 Sheets-Sheet 1
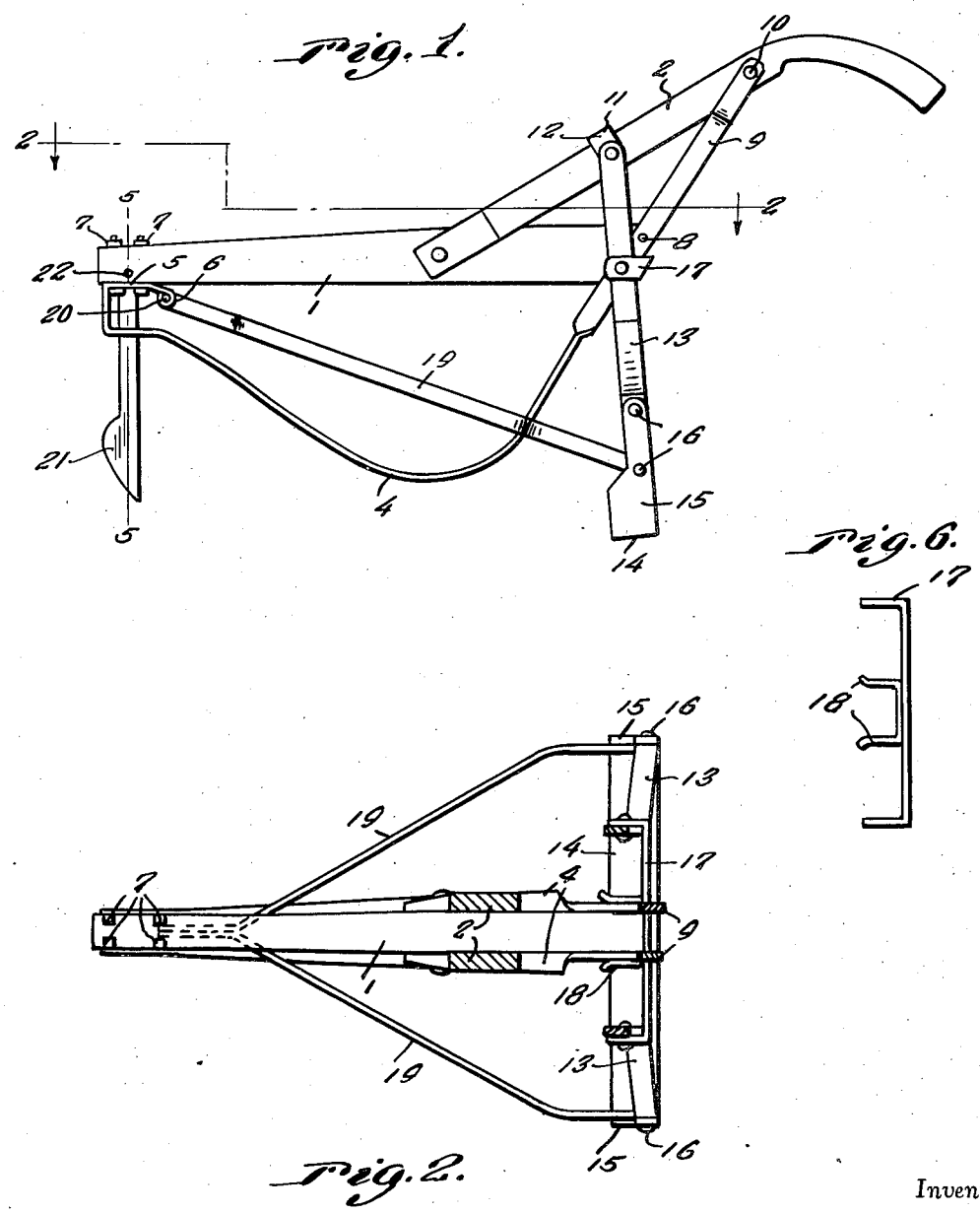
Inventor
C. L. Campbell
By Clarence A. O'Brien and
Hyman Berman
Attorneys May 5, 1936. C. L. CAMPBELL 2,039,702
WEEDER
Filed Dec. 27, 1935 2 Sheets-Sheet 2
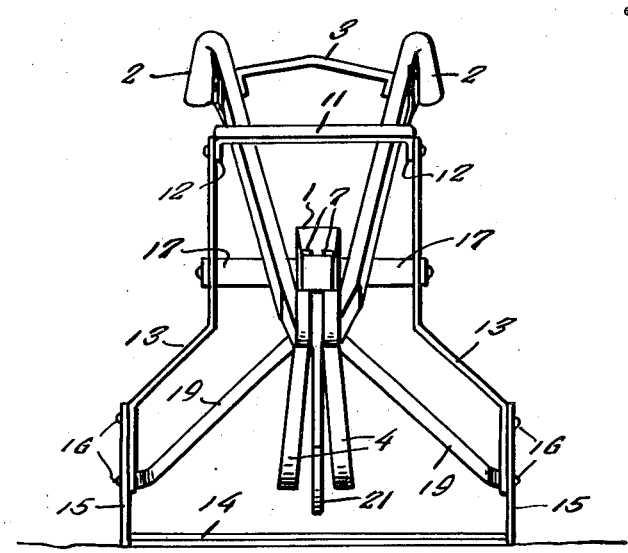
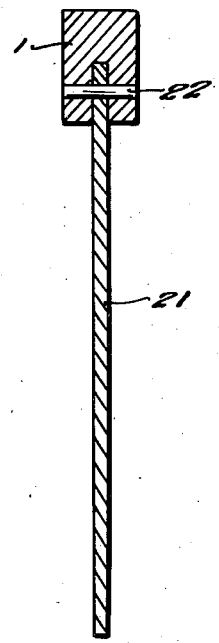
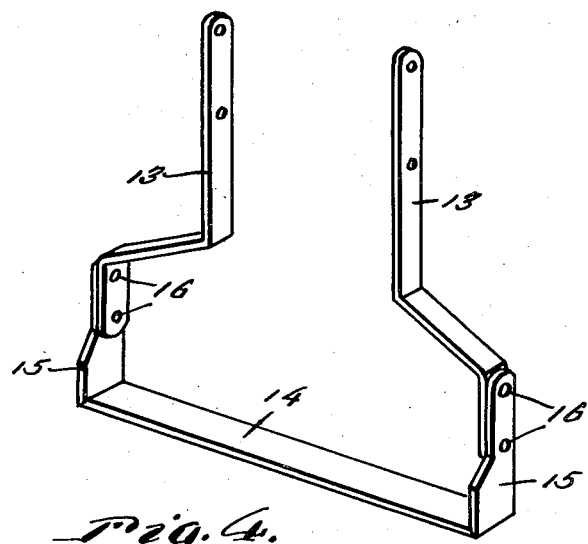
Inventor
C. L. Campbell
By Clarence A. O'Brien and
Hyman Berman, Attorneys Patented May 5, 1936

2,039,702

UNITED STATES PATENT OFFICE 2,039,702

WEEDER

Clarence L. Campbell, Bourbonnais, Ill.

Application December 27, 1935, Serial No. 56,377

5 Claims. (Cl. 97—169)

The present invention relates to new and useful improvements in agricultural implements and has for its primary object to provide, in a manner as hereinafter set forth, a device of this character which is particularly adapted for use in destroying weeds, especially Canadian thistles.

Another important object of the invention is to provide an implement of the aforementioned character embodying a knife which is adapted to travel at or adjacent to the surface of the ground for severing the weeds and the thistles at this point.

Another object of the invention is to provide, in a manner as hereinafter set forth, a weeder embodying a novel mounting for the knife through the medium of which said knife may swing rearwardly in a manner to avoid being damaged in the event that an obstruction, such as a large rock or stone, is encountered.

Still another important object of the invention is to provide a weeder of the character described embodying a novel combination and arrangement of knife, runners, braces, etc., whereby maximum strength and durability will be had.

Other objects of the invention are to provide a weeder of the character set forth which will be comparatively simple in construction, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Fig. 1 is a view in side elevation of a weeder in accordance with the present invention.

Fig. 2 is a view in horizontal section, taken substantially on the line 2—2 of Fig. 1.

Fig. 3 is a front elevational view.

Fig. 4 is a perspective view of the knife and the supporting hangers therefor.

Fig. 5 is a vertical sectional view, taken substantially on the line 5—5 of Fig. 1 with parts omitted.

Fig. 6 is a detail view in top plan of the hanger brace.

Referring now to the drawings in detail, it will be seen that the embodiment of the invention which has been illustrated comprises a beam 1, to which a pair of inclined, rearwardly diverging handles 2 are secured. Extending between the upper portions of the handles 2 is a brace 3.

Mounted beneath the beam 1 is a pair of runners 4 having rearwardly bent forward end portions 5 terminating in eyes 6, said portions 5 being secured beneath the forward end portion of the beam 1 by bolts 7. The runners 4 extend upwardly and are secured to opposite sides of the rear end portion of the beam 1, as at 8, and terminate in diverging rear end portions 9 which are secured, as at 10, to the upper portions of the handles 2.

Extending between the lower portions of the handles 2 is a metal bar 11 having right angularly bent end portions 12 to which angular hangers 13 are pivotally connected. Mounted on the lower ends of the hangers 13 is a transverse knife 14 having upturned end portions 15 secured to said hangers 13, as at 16. Extending between intermediate portions of the hangers 13 is a brace 17 having fixed thereon, at an intermediate point, a substantially U-shaped guide 18 which is adapted to embrace or straddle the rear end portion of the beam 1. Braces 19 are provided for the knife 14, said braces being secured, at their forward ends, by a breakable or frangible pin 20 between the eyes 6 of the runners 4.

Descending from the forward end portion of the beam 1 is a guide 21 in the form of a cutter. As illustrated to advantage in Fig. 5 of the drawings, the guide 21 is secured in the forward end portion of the beam 1 through the medium of a pin 22.

Briefly, the operation of the implement is substantially as follows:

The device is drawn over the ground by any suitable means, such as horses or a tractor. The knife 14, travelling at or adjacent to the surface of the ground, severs all weeds and thistles in the path of the implement at this point. The weeder is adapted to be drawn between two rows of corn or other plants. Should a large rock or other immovable obstruction be encountered by the knife 14, the pin 20 will break thereby permitting said knife to swing rearwardly and upwardly with the hangers 13, thus avoiding severe strain or damage. It will be observed that the runners 4 are shaped to ride over irregularities and obstructions in the surface of the ground. The guide 18 on the brace 17 supports the hangers 13 against the lateral movement relative to the beam 1. The guide 21 which, as hereinbefore stated, is substantially in the form of a cutter travels in the ground for preventing the weeder from swinging laterally when subjected to more strain on one side than the other such, for example, as when one end portion of the knife 14 meets an obstruction such as a stone or root. This permits the implement to be more easily controlled.

It is believed that the many advantages of a weeder constructed in accordance with the present invention will be readily understood, and although a preferred embodiment of the implement is as illustrated and described, it is to be understood that changes in the details of the construction and in the combination and arrangement of parts may be resorted to which will fall within the scope of the invention as claimed.

I claim:

1. A weeder comprising a beam, handles secured to said beam, arcuate runners mounted beneath the beam and secured to the end portions thereof, said runners comprising diverging rear end portions secured to the handles, hangers depending from the handles, a transverse knife extending between the lower ends of the hangers, and braces extending between the knife and the forward portion of the beam.

2. A weeder comprising a beam, handles mounted on said beam, hangers depending from the handles, a knife extending between the lower end portions of said hangers, a brace extending between the hangers, and a substantially U-shaped guide mounted on the brace and adapted to straddle the rear end portion of the beam.

3. A weeder comprising a beam, handles mounted on said beam, hangers journalled on the beam and depending therefrom, a knife extending between the lower end portions of the hangers, a brace extending between intermediate portions of said hangers, a substantially U-shaped guide fixed on the brace and adapted to straddle the rear end portion of the beam for supporting the hangers against relative lateral movement, braces for the knife, and frangible means connecting said braces to the forward end portion of the beam.

4. A weeder comprising a beam, handles mounted on said beam, runners mounted beneath the beam, said runners including rearwardly turned forward end portions secured to the beam, said forward end portions terminating in eyes, said runners being secured to the rear end portions of the beam and including extensions secured to the handles, a bar extending between said handles at an intermediate point, hangers journalled on said bar, a transverse knife, extending between the lower ends of said hangers, said knife including upturned end portions fixed to the hangers, a brace extending between intermediate portions of the hangers, a substantially U-shaped guide fixed on said brace and embracing the rear end portion of the beam, braces connected, at one end, to the knife, frangible means connecting the other ends of the braces to the eyes, and a guide mounted in the forward end portion of the beam and depending therefrom.

5. A weeder comprising a beam, handles mounted on said beam, runners mounted on the beam, hangers supported for swinging movement on the beam, a knife extending between said hangers, braces secured, at one end, to the knife, and frangible means securing the other ends of said braces to the runners.

CLARENCE L. CAMPBELL.